US006437994B1

(12) United States Patent
Blom et al.

(10) Patent No.: US 6,437,994 B1
(45) Date of Patent: Aug. 20, 2002

(54) LLC CONVERTER INCLUDES A CURRENT VARIATION DETECTOR FOR CORRECTING A FREQUENCY ADJUSTING CONTROL SIGNAL OF AN INCLUDED DIFFERENCE DETECTOR

(75) Inventors: Anton Cornelis Blom; Age Jochem Van Dalfsen, both of Eindhoven (NL)

(73) Assignee: Koninklijke Philips Electronics, N.V. (NL)

( * ) Notice: Subject to any disclaimer, the term of this patent is extended or adjusted under 35 U.S.C. 154(b) by 0 days.

(21) Appl. No.: 09/830,786

(22) PCT Filed: Sep. 14, 2000

(86) PCT No.: PCT/EP00/09114

§ 371 (c)(1),
(2), (4) Date: May 1, 2001

(87) PCT Pub. No.: WO01/20758

PCT Pub. Date: Mar. 22, 2001

(30) Foreign Application Priority Data

Sep. 17, 1999 (EP) .............................. 99203052

(51) Int. Cl.[7] .................................. H02M 3/335
(52) U.S. Cl. .......................... 363/16; 315/308
(58) Field of Search ................ 363/16, 17, 15, 363/131, 40, 97; 315/291, 307, 308, 224

(56) References Cited

U.S. PATENT DOCUMENTS 3,881,146 A * 4/1975 Wanlass ...................... 363/28
4,535,399 A * 8/1985 Szepesi ....................... 363/134
5,761,055 A * 6/1998 Okada et al. ................ 323/222

FOREIGN PATENT DOCUMENTS

JP          10225122         8/1998

OTHER PUBLICATIONS

"Optimisation of the Transformer Turns Ration by means of the First Harmonic Approximation", T. Duerbaum et al., Power Conversion, PCIM May 1998 Proceedings, pp. 681–689.

* cited by examiner

Primary Examiner—Shawn Riley
(74) Attorney, Agent, or Firm—Edward W. Goodman

(57) ABSTRACT

An LLC power converter has an output voltage which is determined by a frequency controller controlling the frequency of an on and off switching of the switches (5, 6) of the converter. In order to stabilize the output voltage at varying output currents, a control circuit feeds back the variation of the total current (I) in the converter to the frequency controller (22, 25) for correcting the frequency of the on and off switching of the switches.

11 Claims, 3 Drawing Sheets

LLC CONVERTER INCLUDES A CURRENT VARIATION DETECTOR FOR CORRECTING A FREQUENCY ADJUSTING CONTROL SIGNAL OF AN INCLUDED DIFFERENCE DETECTOR

BACKGROUND OF THE INVENTION

1. Field of the Invention

The present invention relates to an LLC converter including a series arrangement of a first parallel arrangement of a first switch and a first diode, and a second parallel arrangement of a second switch and a second diode. The series arrangement is coupled between a first input terminal and a second input terminal for receiving a DC input voltage, a voltage on the first terminal being positive with respect to a voltage on the second terminal, the cathode of the first diode and the cathode of the second diode being directed towards the first input terminal. The LLC converter further includes a series arrangement of a capacitor, a first inductor and a second inductor coupled in parallel to either the first diode or the second diode, a rectifier coupled to either the first inductor or the second inductor for supplying an output voltage, and a control circuit. The control circuit includes a switching controller for controlling the frequency of an on and off switching of the first switch and the second switch, and a difference detector for detecting a difference between the output voltage and a reference value, and for controlling the switching controller on the basis of this difference. The first diode and the second diode may be intrinsic to the first switch and the second switch, respectively.

The invention further relates to a method for controlling an LLC converter having switches for generating a current in a resonant circuit formed by a series arrangement of a capacitor, a first inductor, and a second inductor, the method including the steps of sensing an output voltage of the converter for obtaining a first control signal, and sensing the current of the converter.

2. Description of the Related Art

In the field of Switched Mode Power Supplies (SMPSs), the use of LLC converters is spreading. An LLC converter is characterized by the series arrangement of a capacitor (C), a first inductor (L) and a second inductor (L) for providing an output voltage. Examples of devices in which an LLC converter is applied are lighting devices, medical systems, displays systems, etc.

The topology of the LLC converter has a number of advantages, such as, a low Electromagnetic Interference (EMI), and a high efficiency. However, in practice, a problem arises in that controlling the output voltage of the converter by adjusting the switching frequency of the switches may lead to large instabilities, as will be explained below.

In a practical embodiment of an LLC converter, the switches are electronic switches, such as MOSFETs (Metal Oxide Semiconductor Field Effect Transistors). Only one of the first switch and the second switch may conduct at any given time to avoid short-circuiting the power supply supplying the DC input voltage. The theoretical on-time of each of the first and second switches is 50%, assuming that both switches are driven symmetrically. In practice, the on-time of the switches will be less than 50% due to transition phenomena occurring during the off-on transition and the on-off transition of the switches.

The LLC converter has a resonance frequency which is determined by the values of the inductors, the capacitor, and external conditions which are governed by the input and output voltages and the load condition.

When the converter is driven below the resonance frequency, the current through the switched-off first switch was negative just before the moment of switching-off. As a result, the first diode parallel to the first switch starts conducting current. Now, switching on the second switch during the time the first diode is conducting results in high switching losses. These losses are caused by the hard recovery of the first diode, which is called hard switching. Preferably, the first and second diodes are fast (or even ultra fast) types in order to limit the switching losses in the hard switching mode. If power MOSFETs, having intrinsic (parasitic) diodes obviating the use of the first and the second diodes, are used as switches, operating the converter in the hard switching mode will most probably destroy the MOSFETs due to the very poor switching behavior of the intrinsic diodes.

Consequently, in practice, the LLC converter is driven above the resonance frequency in order to avoid hard switching. In this soft switching mode, the current through the switched-off first switch is positive just before the moment of switching-off. As a result, the voltage on the connecting node between the first and the second switches commutates, and the second diode parallel to the second switch starts conducting current. The second switch may be switched on at the moment the second diode is conducting, so virtually no switching losses occur. At such operating conditions, the use of MOSFETs with their intrinsic diodes is most suitable.

As to the control behavior of the LLC converter, the following is observed.

In most cases, a load should be supplied with a constant DC voltage. The LLC converter, however, generates an AC voltage which is to be rectified and filtered. A simple rectifier arrangement is a full-bridge rectifier having four diodes, connected in parallel with a filter capacitor.

A known control circuit for an LLC converter includes a series connection of a sensing circuit which generates a voltage by measuring the output voltage and/or output current of the converter, a voltage-to-frequency converter, and a driving stage for driving the switches of the converter. Additionally, an over-current protection circuit may be added. The control circuit may be designed such that the operating frequency is limited to ensure that the converter can only be operated in a predetermined frequency window avoiding, e.g., hard switching.

When frequency control is applied to the LLC converter, the output power, output voltage or output current can be controlled by controlling the switching frequency of the switches of the converter. As elucidated above, an LLC converter using power MOSFETS as switches normally is operated above the resonance frequency. In this operating area, the output power, output voltage or output current will decrease with increasing switching frequencies, whereas the output power, output voltage or output current will increase when the switching frequency is decreased.

At the moment the LLC converter is stabilized for a given supply and load condition at a frequency F, the effective voltage across the resonance capacitor C has reached a value V. By way of example, as the load increases, resulting in an increased output current, the frequency setting of the converter is decreased in order to fulfil the new increased load and supply conditions. This reduction of frequency causes an instability problem, since the output power of the LLC converter is correlated to the effective voltage across the capacitor C multiplied by the switching frequency of the first and second switches. By decreasing the switching frequency of the converter, the output power will temporarily decrease, since the effective voltage V across the capacitor C has not changed yet. The control logic will react by again decreasing the frequency to a value which is too low. On the other hand, after some time the effective voltage across the capacitor C will increase to a value greater than V due to the new operating condition, which is closer to the resonance frequency, so more power can be generated. However, as a result of the undershoot of the frequency control, an overshoot will occur, and the frequency must be increased again. Finally, the resonant voltage V across the capacitor C will stabilize on a new higher value if the instabilities are being damped. As a result, the increased output power can be generated, but there is a certain transition time during which the converter is unstable. These effects, which, with the necessary changes having been made, also play a role when, from a given stable supply and load condition, the load is decreased instead of increased, cause the instabilities in the LLC converter, and cannot be prevented when a simple frequency control is used. Under worst case conditions, the LLC converter remains unstable after a load transition, or is always unstable, when the LLC converter is frequency controlled.

For a fixed input and output voltage, the LLC converter can be designed such that the frequency has a substantially fixed value for varying output power and output current values. In practice, small input voltage variations occur, resulting in a rather limited frequency sweep (i.e., the difference between the minimum and maximum frequency). As a result, the loop gain (i.e., the frequency to output current ratio at a fixed input and output voltage) of the LLC converter designed in this way is extremely high. Consequently, instabilities in the frequency control may occur due to the fact that a small frequency change results in a huge output current change.

For a stable control behavior close to the resonance frequency of the converter, the control circuit would have to be adapted for every change of operating conditions. However, for most applications, this is not a feasible solution. On the other hand, frequency control can be used when the operating frequency is not close to the resonance frequency. However, in this situation, the needed frequency sweep would be large in order to cover all input and output voltage variations.

When current control is applied to the LLC converter, the output parameters of the converter can be controlled.

In Japanese Patent Application JP-A-10225122, an LLC converter is proposed which is regulated by using current control. In addition, a slope compensation method is used to improve the stability of the control circuit. Such a method is known (e.g., from R. Redl, N. O. Sokal: "What a Designer Should Know About Current-mode Control", The Power Electronics Design Conference, Anaheim, Calif., Oct. 15/17, 1985, pages 18–33) to improve the stability of a buck converter, which operates at a fixed frequency and is current controlled. In particular when such a buck converter is operated at a duty cycle higher than 50%, the slope compensation is essential to avoid instabilities.

In general, an advantage of current control of an LLC converter with respect to frequency control, is an improvement of the stability of the converter. A drawback of current control resides in the fact that the total current, i.e., the resonant current and the output current, is measured. This implies that the current measurement is always affected by the resonant current and by changes of the resonant current.

SUMMARY OF THE INVENTION

It is an object of the invention to provide an LLC converter, and a method for controlling an LLC converter, which avoid the instabilities in an LLC converter caused by a basic frequency control.

This object is achieved in an LLC converter, according to the invention, in which the control circuit further includes a current variation detector coupled to the difference detector for correcting the frequency in dependence on variations of a total current through the series arrangement of the capacitor, the first inductor and the second inductor. The correction provided by the current variation detector effectively prevents instabilities of the converter. As the converter frequency is shifted towards the resonance frequency, the resonance current starts increasing. The increase of the resonance current is detected by the current variation detector, which then shifts the frequency away from the resonance frequency. As a result of this corrective action, the output of the converter, e.g., the output voltage, is not affected by the start of an unstable behavior of the LLC converter. Thus, the instability is effectively damped by the control circuit of the converter according to the invention.

A simple, reliable implementation of the current variation detector includes a series arrangement of a current sensing circuit, a rectifier, a filter and a differentiator. The current sensing circuit may be adapted to measure a current directly, e.g., by a current transformer included in the converter total current circuit, or, advantageously, to measure a voltage which is associated with the current, in particular, the effective voltage across the capacitor of the converter. The rectifier may be a half-bridge of a full-bridge diode rectifier or any other suitable type of rectifier. The filter may be a low-pass RC-filter. The differentiator may be a high-pass RC-filter.

A first simple preferred embodiment of the control circuit of the converter according to the invention has the feature where the difference detector includes an error amplifier having a first input supplied with the reference value, and a second input coupled to an output of an adder having a first input supplied with the output voltage, and a second input coupled to the current variation detector.

A second embodiment of the control circuit has the feature where the difference detector includes a first error amplifier having a first input coupled to the output of a second error amplifier having a first input supplied with the reference value, and a second input supplied with the output voltage, the first error amplifier having a second input coupled to an output of an adder having a first input coupled to the current variation detector, a second input supplied with an input voltage of the converter, and a third input supplied with the output voltage. This second preferred embodiment has a relatively slow outer control loop controlling the output voltage of the converter, and generating an input signal for a relatively fast inner loop. The input and output voltages of the converter may preset the inner loop in such a way that the outer loop hardly will have to take corrective actions.

The above object of the invention is further achieved in a method, according to the invention, in which an output voltage of the LLC converter is sensed for generating a first control signal. In addition, the method includes determining the variation of the current for generating a second control signal, correcting the first control signal by the second control signal thereby forming a third control signal, and driving the switches of the converter with a frequency of on and off switching determined by the third control signal. As elucidated above by reference to control circuit components of an LLC converter, this control method provides an simple and effective stabilization of the converter.

BRIEF DESCRIPTION OF THE DRAWINGS

These and other aspects, features and advantages of the invention will be apparent from the appended drawings, in which non-limiting embodiments are shown, and in which.

In the different Figures, the same reference numerals relate to the same components, or to components having the same or a similar function.

DESCRIPTION OF THE PREFERRED EMBODIMENTS

Figure 1A:
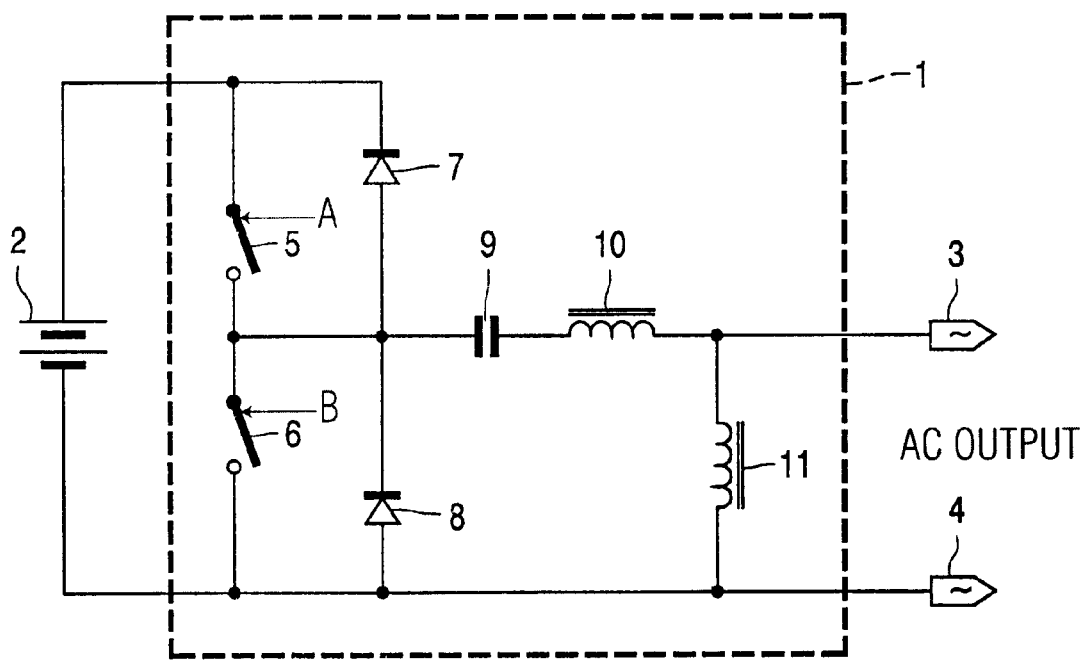
FIG. 1a shows a circuit diagram of an inverter part of an LLC converter.

FIG. 1a shows a basic circuit diagram of an inverter part 1 of an LLC converter, delimited by a box shown in dashed lines. In the inverter part 1 of the converter, DC input power from a DC supply 2 is converted into AC output power supplied at output terminals 3 and 4.

The inverter part 1 includes a first high frequency switch 5 and a second high frequency switch 6 connected in series, a first diode 7 and a second diode 8 connected in parallel to the switches 5 and 6, respectively, and a series arrangement of a resonant capacitor 9, a first resonant inductor 10, and a second resonant inductor 11, the series arrangement being coupled in parallel to the second diode 8. The terminals of the DC supply 2 are coupled to the series arrangement of the switches 5 and 6. The output terminals 3 and 4 are coupled to the terminals of the second resonant inductor 11.

It will be clear that the series arrangement of the resonant capacitor 9 and the first and second resonant inductors 10, 11 may be coupled in parallel to the first diode 7, instead of to the second diode 8. Further, it will be clear that the output terminals 3 and 4 may also be coupled to the terminals of the first resonant inductor 10.

In operation, the switches 5 and 6, e.g., MOSFET-type electronic switches, are opened and closed with a frequency preferably above the resonant frequency of the arrangement of the resonant capacitor 9 and the first and second resonant inductors 10, 11, in order to avoid so-called hard switching. In a symmetrical switching mode, each of the switches 5, 6 will be closed for the same time period, switch 5 being closed while switch 6 is open, and switch 6 being close while switch 5 is open.

Figure 1B:
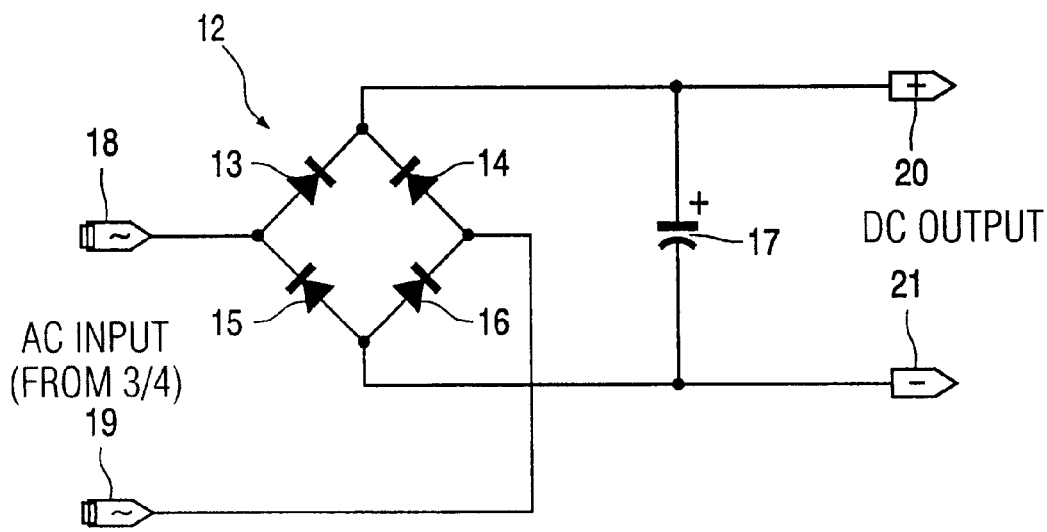
FIG. 1b shows a circuit diagram of a rectifier circuit.

FIG. 1b shows a rectifier circuit comprising a full-bridge rectifier 12 well-known in the art containing four diodes 13, 14, 15 and 16 in a series-parallel connection. A filter capacitor 17 is coupled in parallel to the rectifier 12. The rectifier 12 is coupled to input terminals 18 and 19, and output terminals 20 and 21.

The input terminals 18, 19 of the circuit shown in FIG. 1b may be coupled to the output terminals 3, 4, respectively, of the inverter part 1 shown in FIG. 1a, for providing a conversion of the AC output from the inverter part 1 to a DC output from the rectifier 12. The assembly of the circuits of FIGS. 1a and 1b forms an LLC converter with a DC output.

Figure 2:
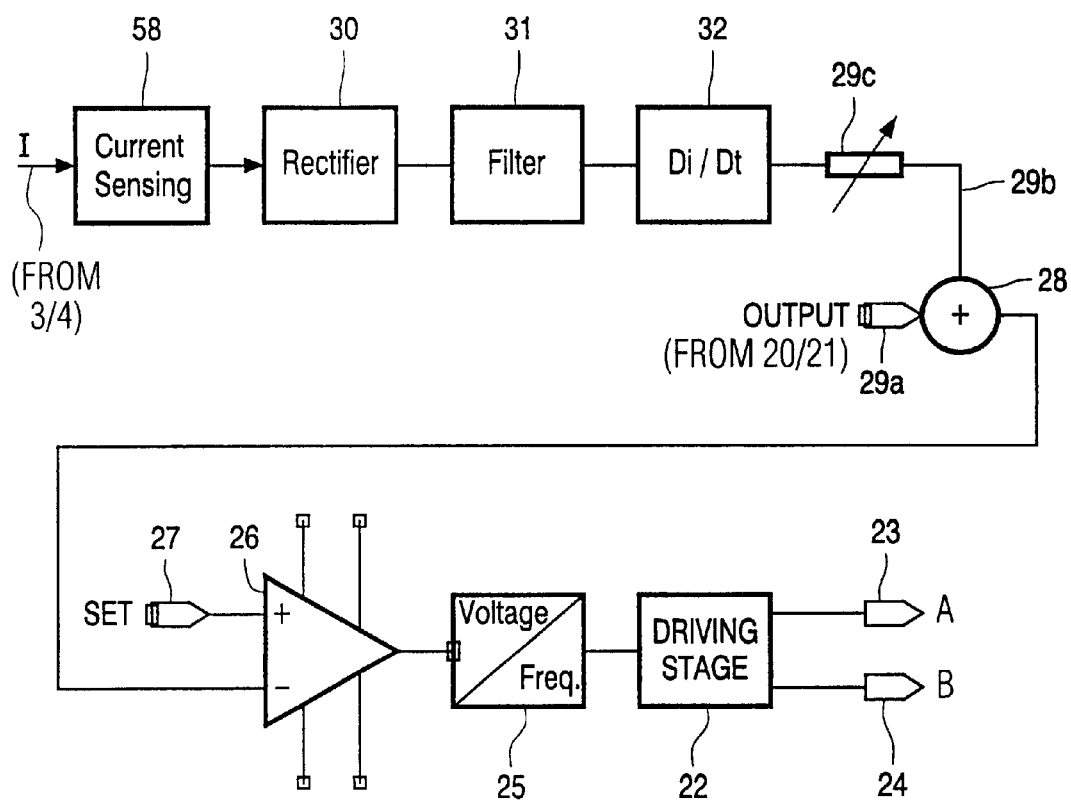
FIG. 2 shows a circuit diagram of a control circuit for an LLC converter.

FIG. 2 shows a control circuit comprising a driving stage 22 producing control signals A and B for switching the switches 5, 6 (FIG. 1) through output terminals 23, 24, respectively. The frequency of the control signals A and B is determined by a voltage-to-frequency converter 25 driving the driving stage 22. In turn, a voltage input to the voltage-to-frequency converter 25 is supplied by an error amplifier 26, comparing a set reference voltage supplied through a terminal 27 to an output signal supplied by an adder 28. The adder 28 supplies a sum signal of a first control signal (an output voltage of the converter supplied through an input terminal 29a), and a second control signal (supplied through an input terminal 29b).

The second control signal is generated from the total output current I (the load current plus the resonant current) of the converter. In turn, the current I may, at a given frequency, be represented by the voltage across the capacitor 9, the inductor 10 or the inductor 11. The current I is sensed by a current sensing circuit 58, rectified by a rectifier 30, filtered by a filter 31, differentiated by a differentiator 32, and scaled to a proper value by attenuator 29c before being supplied to the adder 28 through the input terminal 29b.

At the moment the control of the LLC converter becomes unstable, the second control signal will generate a feedback signal preventing instabilities of the converter.

Figure 3:
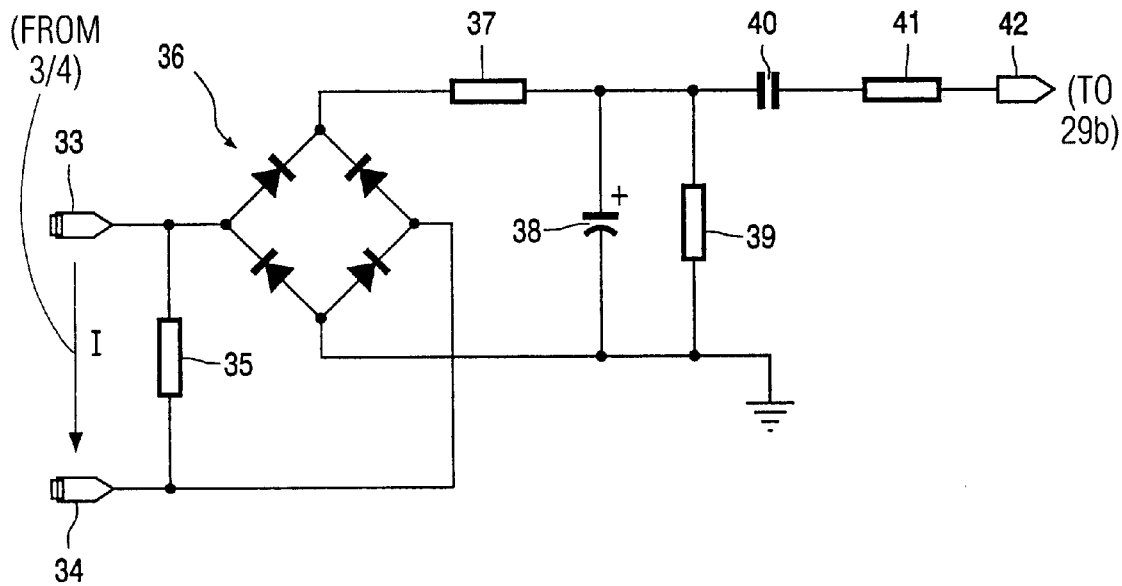
FIG. 3 shows a circuit diagram of an embodiment of a section of the control circuit of FIG. 2.

FIG. 3 shows a circuit for generating the second control signal, comprising two input terminals 33, 34 coupled to a shunt resistor 35 which, in turn, is coupled in parallel to two input terminals of a bridge rectifier 36. A series arrangement of a resistor 37 and a capacitor 38 is coupled in parallel to two other terminals of the bridge rectifier 36. A bleeder resistor 39 is coupled in parallel to the capacitor 38. A common node between the resistor 37, the capacitor 38 and the resistor 39 is coupled to a series arrangement of a capacitor 40 and a resistor 41 leading to an output terminal 42 to be coupled to the adder 28 (FIG. 2).

A signal associated with the total AC current of the converter is supplied to the input terminals 33, 34, generating an AC voltage across the resistor 35. This voltage is rectified by the rectifier 36 (providing full-wave rectification) and filtered by the resistor 37, the capacitor 38, and the resistor 39. Thus, the average DC voltage across the capacitor 38 changes according to the actual absolute value of the total current of the converter. This voltage variation across the capacitor 38 is fed through the capacitor 40 and the resistor 41 to the adder 28 (FIG. 2) and, consequently, to the error amplifier 26 (FIG. 2). As a result, any changes of the resonant energy in resonant capacitor 9 (FIG. 1) immediately result in a corrective action of the control circuit.

Figure 4:
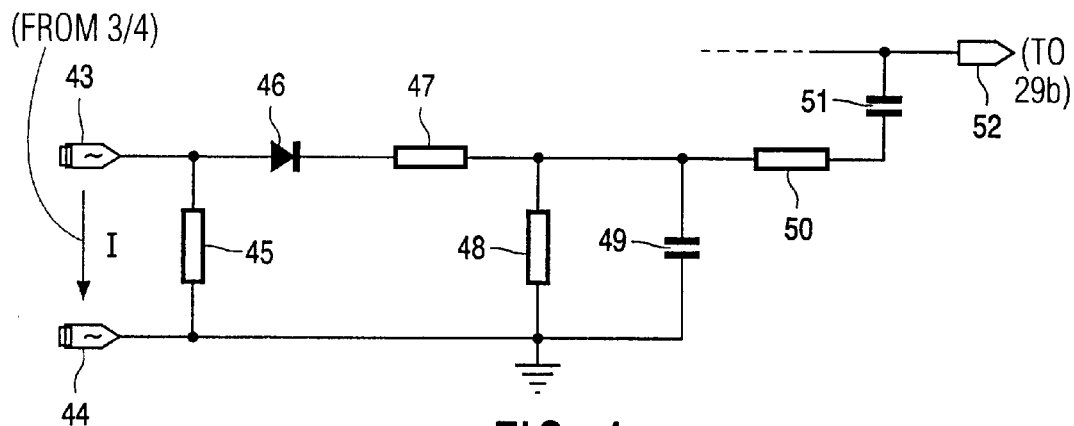
FIG. 4 shows a circuit diagram of an alternative embodiment or the section of FIG. 3.

FIG. 4 shows an alternative circuit for generating the second control signal, comprising two input terminals 43 and 44, coupled to a shunt resistor 45, which, in turn, is coupled in parallel to a series arrangement of a diode 46, a first resistor 47 and a second resistor 48. The second resistor 48 in coupled in parallel to a capacitor 49. The node coupling the first resistor 47, the second resistor 48 and the capacitor 49, is connected to a series arrangement of a resistor 50 and a capacitor 51 leading to an output terminal 52 to be coupled to the adder 28 (FIG. 2).

A signal associated with the total output current of the converter is supplied to the input terminals 43, 44, generating an AC voltage across the resistor 45. This voltage is rectified and filtered by the diode 46 (providing half-wave rectification), the resistors 47 and 48, and the capacitor 49. Thus, the average DC voltage across the capacitor 49 changes according to the actual absolute value or the total current of the converter. This voltage across the capacitor 49 is fed through resistor 50 and the capacitor 51 to the adder 28 (FIG. 2) and, consequently, to the error amplifier 26 (FIG. 2). As a result, any changes of the resonant energy in resonant capacitor 9 (FIG. 1) immediately result in a corrective action of the control circuit.

From the above description of the circuits of FIGS. 3 and 4, it will be clear that the function of the respective circuits is identical, the only difference essentially lying in the implementation of the rectification of the AC voltage across the resistor 35 or 45, respectively.

Figure 5:
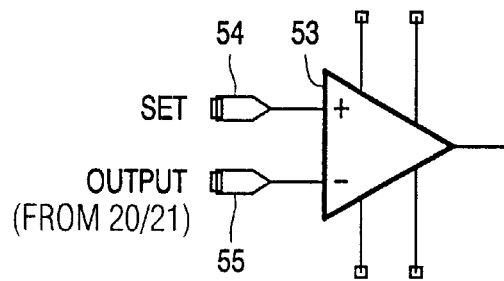
FIG. 5 shows a circuit diagram of a second embodiment of a control circuit for an LLC converter.
Figure 5:
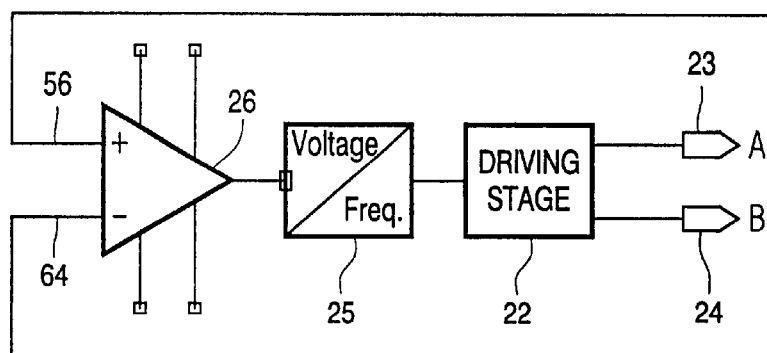
Figure 5:
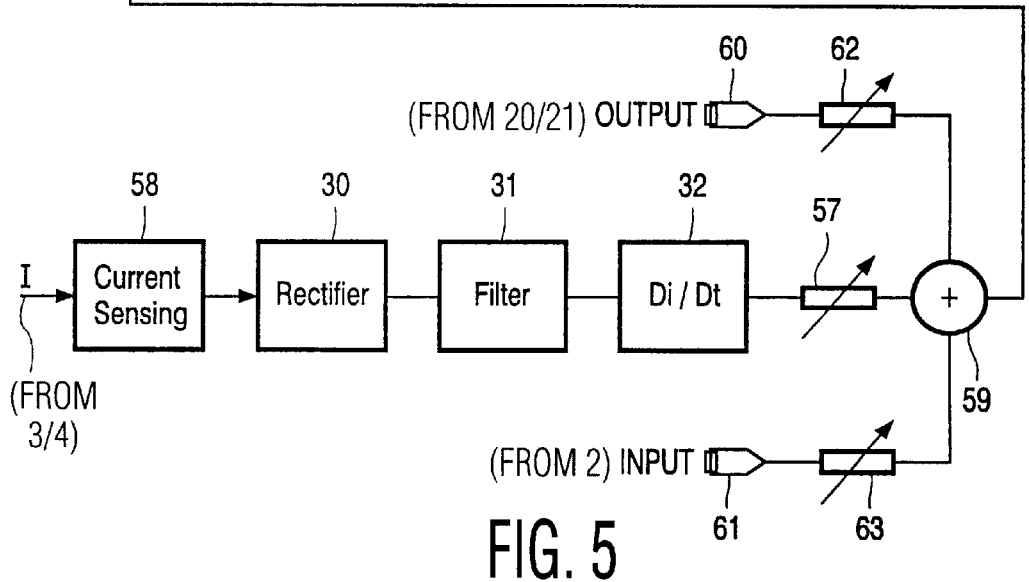

FIG. 5 shows, in conformity with FIG. 2, a first error amplifier 26, providing an output voltage to a voltage-to-frequency converter 25, which, in turn, drives a driving stage 22. The driving stage 22 produces the control signals A and B having a frequency determined by the voltage to frequency converter 25 through output terminals 23, 24 for switching the switches 5, 6 (FIG. 1), respectively.

A second error amplifier 53 has a first input terminal 54 to which a set voltage is supplied, and a second input terminal 55 to which the output voltage of the converter is supplied. The output of the second error amplifier 53 is coupled to a first input terminal 56 of the first error amplifier 26.

An AC signal representing the total output current I (the load current plus the resonant current) of the converter is supplied to a current sensing circuit 58, a rectifier 30, a filter 31, a differentiator 32 and an attenuator 57, and is then supplied to an adder 59. The adder 59 is further supplied with the output voltage of the converter through an input terminal 60, and with the input voltage of the converter through an input terminal 61. The signals input through the input terminals 60 and 61 may be attenuated to a suitable level by variable resistors 62 and 63, respectively. The output from the adder 59 is coupled to a second input terminal 64 of the first error amplifier 26.

It is observed here, that the feed-forward supply of the input voltage of the converter through the input terminal 61 is not essential, but leads to an optimization of the control.

The control logic thus defined for the LLC converter is based on an inner and an outer control loop: a relatively slow outer loop controlling the output voltage of the converter, and generating the input (set) signal for the relatively fast inner loop. The inner loop will be preset by the input and the output voltages of the converter. As a result, the outer loop hardly will have to take any corrective action. Changes of the input and output parameters of the LLC converter immediately result in a reaction of the inner loop. By designing the inner loop with a relatively small time constant, and the outer loop with a relatively large time constant, a stable control algorithm for an LLC converter is obtained.

Accordingly, the present invention provides an LLC converter with a control circuit employing a control method for greatly enhancing the stability of the converter by determining the variation of the total current of the converter and using a corresponding control signal for additionally controlling the frequency of on and off switching of the switches of the converter.

What is claimed is:

1. An Inductor-Inductor-Capacitor (LLC) converter comprising:

a series arrangement of a first parallel arrangement of a first switch and a first diode, and a second parallel arrangement of a second switch and a second diode, the series arrangement being coupled between a first input terminal and a second input terminal for receiving a DC input voltage, a voltage on the first terminal being positive with respect to a voltage at the second terminal, the cathode of the first diode and the cathode of the second diode being directed towards the first input terminal;

a series arrangement of a capacitor, a first inductor and a second inductor coupled in parallel to one of the first diode and the second diode;

a rectifier coupled to one of the first inductor and the second inductor for supplying an output voltage; and a control circuit including switching control means for controlling a frequency of an on and off switching of the first switch and the second switch, and difference detection means for detecting a difference between said output voltage and a reference value, and for controlling said switching control means on the basis of said difference, characterized in that the control circuit further comprises:

current variation detection means coupled to said series arrangement of the capacitor, the first inductor and the second inductor for detecting a total current through said series arrangement, said current variation detection means being coupled to said difference detection means for correcting said frequency in dependence on variations of said total current through the series arrangement.

2. The LLC converter as claimed in claim 1, characterized in that the current variation detection means comprises a series arrangement of a current sensing circuit, a rectifier, a filter and a differentiator.

3. The LLC converter as claimed in claim 2, characterized in that the current sensing circuit senses the effective voltage across the capacitor.

4. The LLC converter as claimed in claim 1, characterized in that the difference detection means comprises:

an adder having a first input coupled to receive said output voltage, and a second input coupled to the current variation detection means; and an error amplifier having a first input coupled to receive said reference value, and a second input coupled to an output of said adder.

5. The LLC converter as claimed in claim 1, characterized in that the difference detection means comprises:

an adder having a first input coupled to the current variation detection means, and a second input coupled to receive the DC input voltage of the converter;

a first error amplifier having a first input coupled to receive said reference value, and a second input coupled to receive said output voltage; and a second error amplifier having a first input coupled to an output of said first error amplifier, and a second input coupled to an output of said adder.

6. The LLC converter as claimed in claim 5, characterized in that the adder has a third input coupled to receive said output voltage.

7. A method for controlling an Inductor-Inductor-Capacitor (LLC) converter comprising switches for generating a current in a resonant circuit formed by a series arrangement of a capacitor, a first inductor, and a second inductor, the method comprising the steps:

sensing an output voltage of the LLC converter for forming a first control signal; and controlling an on/off frequency of said switches in dependence on said first control signal, characterized in that said method further comprises the steps:

sensing a current in the series arrangement of the converter;

determining a variation of said current for forming a second control signal;

correcting the first control signal with the second control signal for forming a third control signal; and driving the switches of the converter with a frequency of on and off switching determined by the third control signal.

8. The method as claimed in claim 7, characterized in that the third control signal is formed by adding the first control signal and the second control signal.

9. The method as claimed in claim 7, characterized in that the method further comprises the steps:

comparing the third control signal to a reference signal for forming a difference signal between the third control signal and the reference signal; and driving the switches of the converter with a frequency of on and off switching determined by said difference signal.

10. The method as claimed in claim 7, characterized in that the method further comprises the steps:

determining a difference between the output voltage and a reference voltage for forming a fourth control signal; and correcting the third control signal by the fourth control signal for generating said frequency of on and off switching.

11. The method as claimed in claim 10, characterized in that said method further comprises the steps:

sensing an input voltage of the converter for forming a fifth control signal; and correcting the first control signal by the fifth control signal for generating said frequency of on and off switching.

* * * * *